United States Patent [19]
Chen

[11] Patent Number: 5,288,712
[45] Date of Patent: Feb. 22, 1994

[54] PERVAPORATION PROCESS EMPLOYING PERMEATE RECYCLE

[75] Inventor: Tan J. Chen, Baton Rouge, La.

[73] Assignee: Exxon Research & Engineering Co., Florham Park, N.J.

[21] Appl. No.: 957,116

[22] Filed: Oct. 7, 1992

[51] Int. Cl.$^5$ ............................................. B01D 61/36
[52] U.S. Cl. ................................... 210/640; 210/644; 210/651
[58] Field of Search ............... 210/651, 640, 634, 644, 210/649–654

[56] References Cited

U.S. PATENT DOCUMENTS 2,985,588  5/1961  Benning et al. .
3,370,102  2/1968  Carpenter et al. .
4,617,127  10/1986  Light ..................................... 210/651
4,774,365  9/1988  Chen et al. ........................... 568/697

*Primary Examiner*—Frank Sever
*Attorney, Agent, or Firm*—Joseph J. Allocca

[57] ABSTRACT

The selectivity of a membrane pervaporation aromatics/non-aromatics separation process is unexpectedly improved by the recycle of permeate to the separation process for co-processing with fresh feed. The selectivity obtained is greater than that achieved by processing either the feed or a recycle permeate stream by itself.

5 Claims, No Drawings

PERVAPORATION PROCESS EMPLOYING PERMEATE RECYCLE

BACKGROUND OF THE INVENTION

1. Field of the Invention

The present invention is a means for increasing the selectivity of a membrane pervaporation aromatics/nonaromatics separation process. Selectivity is unexpectedly increased by recycling part of the permeate to the initial separation process stage for co-processing in said stage with fresh feed. The selectivity obtained is greater than that obtainable by processing either the feed or a recycle permeate stream by itself.

2. Description of the Related Art

It is common in membrane separation processes to recycle either or both of various permeate or retentate streams to the primary separation zone. Similarly, passage of permeate and/or retentate streams to independent downstream permeation zones for additional separate treatment or processing is also fairly common and employed as a means for improving the quality of the desired products.

U.S. Pat. No. 2,985,588 is directed to a method for the start up and shut down of pervaporation process used for separating organic mixtures, including hydrocarbons, in which a feed stream is sent to a first permeation zone producing a first permeate and a first retentate. The first permeate is sent to a second permeation zone wherein it is split into a second permeate and a second retentate. The second retentate is recycled to the first permeation zone while the second permeate is sent to a third permeation zone wherein it is split into a third retentate and a third permeate, said third retentate being recycled to the second permeation stage while said third permeate is recovered as pure product (e.g. benzene). Returning to the first permeation stage, the first retentate from said first permeation stage is sent to separate down stream permeation stage 2A wherein it is split into separate retentate stream 2A and permeate stream 2A, which permeate stream 2A is recycled to the first permeation zone while the retentate stream 2A is sent to get another separate down stream permeation stage 3A wherein it is split into separate retentate stream 3A and permeate stream 3B, which permeate stream 3A is recycled to permeation zone 2A while retentate stream 3A is recovered as product. Permeate from a given permeation stage is never recycled to the input of the same stage.

U.S. Pat. No. 3,370,102 feeds permeate from a first separation stage to a second separation stage wherein said permeate is split into a second permeate stream and a retentate stream. The retentate stream from said second separation stage is recycled to the inlet of the first separation stage. The second permeate stream is fed to a third separation stage wherein it is split into a third permeate stream which is recovered, and a third retentate stream which is recycled to the inlet of the second separation stage.

U.S. Pat. No. 4,617,127 produces low alcohol content beverages by passing a high alcohol content stream to a membrane separation zone to produce an alcohol rich permeate and an alcohol lean retentate. Part of the retentate is recovered while part is recycled to the inlet of the first membrane separation stage for admixture with fresh feed.

U.S. Pat. No. 4,774,365 pervaporatively separates alcohols from ethers. Alcohols constitute the permeate which is subsequently recycled to the inlet of an upstream etherification process for reuse.

DESCRIPTION OF THE INVENTION

In the process of the present invention a feed stream containing a mixture of aromatics and non-aromatics is contacted with an aromatics selective pervaporation membrane. Such aromatic/non-aromatic feed stream includes petroleum and chemical streams such as cat naphtha, gas oil, diesel oil, fuel oil unextracted lube oil, etc., benzene, toluene, xylene containing streams, chemical processes streams such as aromatization or dearomatization streams, aromatic dealkylation streams, aromatic alkylation streams, typically any stream containing a mixture of aromatics and non-aromatics.

The feed stream is contacted with one face of the aromatics selective pervaporation membrane under pervaporation conditions.

The pervaporation process is generally run at high temperature, e.g., greater than 100° C., preferably greater than 160° C. and more preferably at even higher temperature, and generally relies on vacuum on the permeate side to evaporate the permeate from the surface of the membrane and maintain the concentration gradient driving force which drives the separation process. The maximum temperatures employed in pervaporation will be those necessary to vaporize the components in the feed which one desires to selectively permeate through the membrane while still being below the temperature at which the membrane is physically damaged. While a vacuum may be pulled on the permeate side, operation at atmospheric pressure on the permeate side is also possible and economically preferable. In pervaporation it is important that the permeate evaporate from the downstream side (permeate side) of the membrane. This can be accomplished by either decreasing the permeate pressure (i.e., pulling a vacuum) if the permeate boiling point is higher than the membrane operating temperature or by increasing the membrane operating temperature above the boiling point of the permeate in which case the permeate side of the membrane can be at atmospheric pressure. This second option is possible when one uses a membrane capable of functioning at high temperatures. In some cases if the membrane operating temperature is greater than the boiling point of the permeate, the permeate side pressure can be greater than 1 atmosphere.

It has been found that recycling part of the aromatic permeate from the pervaporation zone back to the inlet of said pervaporation zone for mixture with and coprocessing with fresh feed in said pervaporation zone results in the improved aromatics selectivity of the pervaporation process. The aromatics selectivity of the process when the feed constitutes a mixture of permeate recycle and fresh feed is unexpectedly higher than when the feed is exclusively either permeate recycle or fresh feed.

The amount of permeate recycled to the pervaporation zone inlet is in the range of 5 to 75 wt %, preferably 10 to 60 wt %, most preferably 15 to 40 wt % of the fresh feed sent to the pervaporation zone.

The process preferably employs a dense film, nonporous membrane.

Membranes which are useful in such separations include polyurea urethane disclosed and claimed in U.S. Pat. No. 4,914,064, polyurethane imides disclosed and claimed in U.S. Pat. No. 4,929,358, polyester imides disclosed and claimed in U.S. Pat. No. 4,944,880 (preferably polyethylene adipate-imide or polyethylene succinate-imide), isocyanurate crosslinked polyurethane membranes, disclosed and claimed in U.S. Pat. No. 4,983,338 and U.S. Pat. No. 4,929,357, preferably the polyester imides of U.S. Pat. No. 4,944,880 and U.S. Pat. No. 4,990,275, all of which are incorporated herein by reference.

Polyurethane and polyurea-urethane membranes described in U.S. Pat. No. 4,115,465 can also be used. If supported on thermally stable backings such as Teflon, as disclosed in U.S. Ser. No. 452,888 filed Dec. 19, 1989, then these non-aromatic polyurethane and polyureaurethane membranes of U.S. Pat. No. 4,115,465 can be employed at elevated temperatures, in excess of 120° C.

Halogenated polyurethane membranes described in U.S. Pat. Nos. 5,028,685 and 5,093,003 can also be employed in the separation.

Polyurethane-imide membranes preferably those containing polyester segments, can also be used and are described in U.S. Pat. No. 4,929,358.

Other useful membranes are described in U.S. Pat. No. 4,976,868 which describes polyester membranes per se, such as membranes made of polyethylene terephthalate/cyclohexane-dimethanol terephthalate and U.S. Pat. Nos. 4,946,594 and 4,997,906 which describe a crosslinked copolymer membrane derived from an aliphatic polyester, a dianhydride and a diisocyanate.

New, multi-block copolymer membranes are also suitable for use in the aromatics/nonaromatics separation process, and are described and claimed in U.S. Pat. No. 5,039,418, U.S. Pat. No. 5,039,422, U.S. Pat. No. 5,079,417, U.S. Pat. No. 5,049,281, U.S. Pat. No. 5,130,017; U.S. Pat. No. 5,221,481, (U.S. Ser. No. 624,426) and U.S. Pat. No. 5,096,592.

Polyacrylate membranes may also be used. Acrylic acid ester homopolymers or their copolymers with each other or with acrylic acid can be formed into membranes. The acrylic acid monomer units can be in free-acid form or partly or totally neutralized with metal or alkylammonium ions. The membranes can be covalently or ionically crosslinked.

The process of aromatics/nonaromatics separation using any aromatics selective pervaporation membrane, such as those identified above, can be positively diene fitted by the present invention.

The membranes can be used in any convenient form such as sheets, tubes or hollow fibers. Sheets can be used to fabricate spiral wound modules familiar to those skilled in the art.

An improved spiral wound element is disclosed wherein one or more layers of material are used as the feed spacer, said material having an open cross-sectional area of at least 30 to 70% and wherein at least three layers of material are used to produce the permeate spacer characterized in that the outer permeate spacer layers are support layers of a fine mesh material having an open cross-sectional area of about 10 to 50% and a coarse layer having an open cross-sectional area of about 50 to 90% is interposed between the aforesaid fine outer layers, wherein the fine layers are the layers in interface contact with the membrane layers enclosing the permeate spacer. While the permeate spacer comprises at least 3 layers, preferably 5 to 7 layers of alternating fine and coarse materials are used, fine layers always being the outer layers. In a further improvement an additional woven or non-woven chemically and thermally inert sheet may be interposed between the membrane and the multi-layer spacers, said sheet being for example a sheet of Nomex about 1 to 15 mils thick.

Alternatively, sheets can be used to fabricate a flat stack permeator comprising a multitude of membrane layers alternately separated by feed-retentate spacers and permeate spacers. The layers are glued along their edges to define separate feed-retentate zones and permeate zones. The edge gluing is performed such that in any given layer the two parallel edges are glued while in the layers immediately above and below, the edge pairs which are glued are 90 degrees out of register with the previously mentioned pair. Alternate feed-retentate and permeate zones are defined which are perpendicular in flow one to the other. This device is described and claimed in U.S. Pat. No. 5,104,532.

Tubes can be used in the form of multi-leaf modules wherein each tube is flattened and placed in parallel with other flattened tubes. Internally each tube contains a spacer. Adjacent pairs of flattened tubes are separated by layers of spacer material. The flattened tubes with positioned spacer material is fitted into a pressure resistant housing equipped with fluid entrance and exit means. The ends of the tubes are clamped to create separate interior and exterior zones relative to the tubes in the housing. Apparatus of this type is described and claimed in U.S. Pat. No. 4,761,229.

Hollow fibers can be employed in bundled arrays potted at either end to form tube sheets and fitted into a pressure vessel thereby isolating the insides of the tubes from the outsides of the tubes. Apparatus of this type are known in the art. A modification of the standard design involves dividing the hollow fiber bundle into separate zones by use of baffles which redirects fluid flow outside the hollow fibers of the bundle and prevents fluid channelling and polarization on the outside of the hollow fibers. This modification is disclosed and claimed in U.S. Ser. No. 413,178 filed Oct. 18, 1989, now U.S. Pat. No. 5,124,253.

Preferably the direction of flow in a hollow fiber element will be counter-current rather than co-current or even transverse. Such counter-current flow can be achieved by wrapping the hollow fiber bundle in a spiral wrap of flow-impeding material. This spiral wrap extends from a central mandrel at the center of the bundle and spirals outward to the outer periphery of the bundle. The spiral wrap contains holes along the top and bottom ends whereby fluid entering the bundle for flow outside the hollow fibers at one end is partitioned by passage through the holes and forced to flow parallel to the hollow fibers down the channel created by the spiral wrap. This flow direction is counter-current to the direction of flow inside the hollow fibers. At the bottom of the channels the fluid re-emerges from the hollow fiber bundle through the holes at the opposite end of the spiral wrap and is directed out of the module. This device is disclosed and claimed in copending application U.S. Ser. No. 802,158 filed Dec. 4, 1991.

EXAMPLES

To demonstrate the invention three runs were conducted under the same set of pervaporation conditions, 140° C. and 10 torres, using the same polyester (adipate) imide membrane.

The polyester (adipate) imide membrane was prepared by first endcapping one part of 2000 molecular weight polyethylene adipate (PEA) with 2 parts of pyromellitic anhydride (PMDA) and then reacting one part of the endcapped polymer with methylene dianiline (MDA) to form a polyamic acid. The polyamic acid was then coated onto a 0.1 micron pore size Gore teflon sheet with polyethylene terephthalate (PET) support (K-150). The viscosity of the polyamic acid was in the range of 90-150 cps @ room temperature. Curing for the coating was nominally 260° C. for 11 minutes.

In run 1 fresh heavy cat naphtha was used as feed. In run 2 100% permeate obtained from the same heavy cat naphtha feed was recycled and used as the exclusive feed. In run 3 a mixture of 77 wt % HCN and 23 wt % permeate was used as feed. The results are presented in Table 1 below:

TABLE 1

COMPOSITIONAL DATA FROM LAB RUNS ON FEED/PERMEATE SAMPLES

|  | 100% HCN | 77% HCN/ 23% Permeate | 100% Permeate |
|---|---|---|---|
| Aromaticity, wt. % | 54.0 | 59.4 | 76.7 |
| Performance |  |  |  |
| Flux, Kg/M2.day | 204 | 234 | 353 |
| Perm. Arom., wt. % | 80.0 | 84.8 | 91.1 |
| Arom/Non-Arom Sel. | 3.4 | 3.8 | 3.1 |

An aromatics/nonaromatics selectivity of 3.4 was obtained when heavy cat naphtha was used as the sole feed whereas a selectivity of 3.1 was obtained when permeate from a heavy cat naphtha pervaporation process was used as the exclusive feed to the test unit. Presumably the lower selectivity obtained with the 100% permeate feed is due to the fact that the permeate is very aromatic (76.7%) and the membrane was swelled by the aromatics in the feed. Unexpectedly, however, the selectivity obtained with the 77/23 wt % blend of HCN/permeate recycle was higher at 3.8 than that of the feed or the permeate alone. The flux was in line with expectations based on the flux obtained with either the HCN feed or the pure permeate recycle.

Part of the excellent aromaticity of the permeate secured when using the 77/23 wt % blend of HCN/permeate can be attributed to the unexpected synergism between the fresh feed and the recycled permeate and from the higher aromaticity of the blend feed (59 wt %). Be that as it may, however, that selectivity should increase when using as feed a blend of fresh feed (HCN) and recycled permeate is totally unexpected.

The RON/MON qualities of the permeate obtained from using the blend feed should be excellent because its aromaticity is over 84 wt %.

In addition to the unexpected excellent selectivity of the feed/permeate blend, another benefit of permeate recycle operations is that the liquid volumetric flow of the feed through the pervaporation spiral wound elements is increased substantially as compared to the case of fresh feed only. This is expected to result in significantly higher element efficiency.

What is claimed is:

1. A method for increasing the selectivity of a membrane pervaporation aromatics/nonaromatics separation process comprising contacting a feed stream comprising aromatics and non-aromatics with an aromatics selective membrane in a pervaporation zone, recovering an aromatics rich permeate and an aromatics lean retentate from said pervaporation zone, and recycling part of the aromatics rich permeate directly to the inlet of said pervaporation zone wherein said recycled permeate and fresh feed are combined, and coprocessing said mixture of fresh feed and recycled permeate through said pervaporation zone.

2. The method of claim 1 wherein the amount of permeate which is recycled to the inlet of the pervaporation zone is in the range of 5 to 75 wt % of the fresh feed sent to the pervaporation zone.

3. The method of claim 2 wherein the amount of permeate which is recycled to the inlet of the pervaporation zone is in the range of 10 to 60 wt % of the fresh feed sent to the pervaporation zone.

4. The method of claim 1, 2 or 3 wherein the aromatics selective membrane is a polyester-imide membrane.

5. The method of claim 4 wherein said aromatics selective membrane is a polyethylene adipate-imide membrane or a polyethylene succinate-imide membrane.

* * * * *